UNITED STATES PATENT OFFICE.

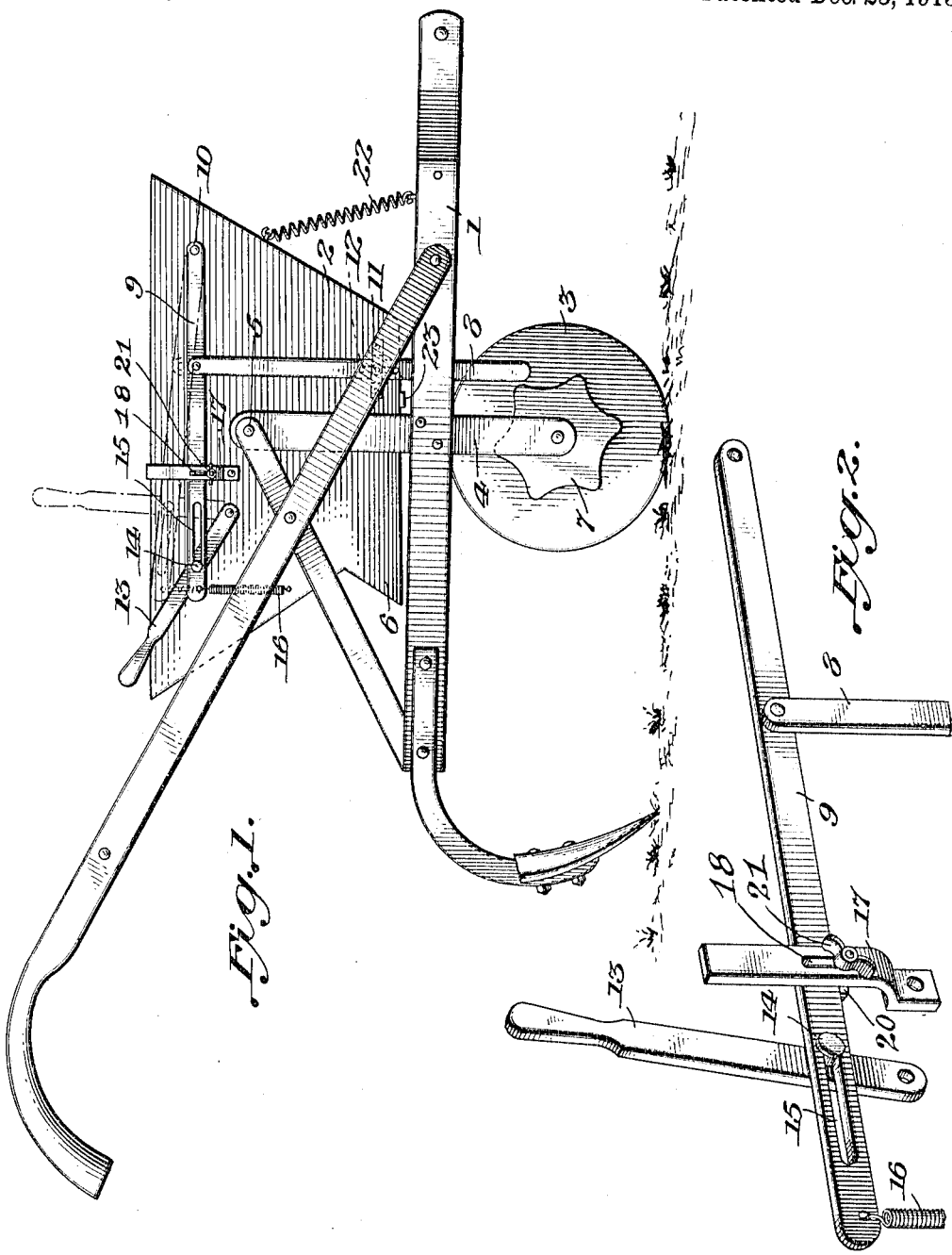

SIMEON R. SIKES, OF OCILLA, GEORGIA.

FERTILIZER-DISTRIBUTER.

1,081,991.

Specification of Letters Patent.

Patented Dec. 23, 1913.

Application filed August 11, 1913. Serial No. 784,240.

*To all whom it may concern:*

Be it known that I, SIMEON R. SIKES, a citizen of the United States, residing at Ocilla, in the county of Irwin and State of Georgia, have invented certain new and useful Improvements in Fertilizer - Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in fertilizer distributers and more particularly to that type of construction which comprises a hopper operative to discharge its contents by body tilting movements and having its operation initiated by the ground wheel.

The object of the invention is to provide operative connections between the ground wheel and the hopper which are of extremely simple character and include elements which may be quickly and easily adjusted to vary the throw of the hopper and consequently to regulate the quantum of the material discharged on each tilting movement of the hopper; and which are readily operative without interference with any particular adjustment thereof to wholly interrupt the tilting movements and consequently discharging operations of the hopper.

Other objects and advantages appear as the description proceeds.

An embodiment of the invention is illustrated in the accompanying drawings in which:—

Figure 1 is a side elevation of a fertilizer distributer in which the features of the invention are incorporated. Fig. 2 is a detail perspective view of certain of the elements of the operative connections between the hopper and the ground wheel.

Similar characters of reference designate corresponding parts in both of the views.

The fertilizer distributer shown comprises the usual beam 1, hopper 2, and ground wheel 3. The support for the hopper consists of a pair of uprights 4 between which the hopper is pivoted, as at 5, and these uprights which are secured to the beam 1 are preferably extended below said beam to furnish bearings for the shaft or axle of the ground wheel.

The hopper 2 has at its rear end a discharge mouth 6 and is bodily tiltable in order to periodically discharge its contents through the outlet 6.

The body tilting movements of the hopper are initiated by a spur wheel 7 which is coaxial with the ground wheel and rotates therewith and the intermediate connections between the spur wheel and the hopper includes essentially an arm 8 which is associated with the hopper and has its lower end normally disposed in the path of the teeth of the wheel 7 for engagement thereby.

The arm 8 in the normal operation of the machine is rigid with the hopper but it is also adjustable in order that its lower end may have a greater or less duration of engagement by each tooth of the wheel 7. For these purposes the arm 8 is pivoted at its upper end to a horizontal lever 9 which in turn is pivoted at its forward end to the hopper, as at 10; and said arm is also slidably associated with the hopper at a point suitably below the lever 9, for example, by a pin 11 provided on the hopper and projecting through a slot 12 in said arm. The adjustment of the arm 8 is effected by raising or lowering the lever 9. When the lever 9 is raised the arm 8 is also raised and the duration of the engagement of the teeth of the wheel 7 with the lower end of the said arm is lessened and the throw of the hopper and quantum of material discharged is also lessened. When the lever 9 is lowered the arm 8 is also lowered and the duration of the engagement of the teeth of the wheel 7 with the lower end of said arm is increased and the throw of the hopper and quantum of material discharged is correspondingly increased. If the lever 9 be raised sufficiently to cause the lower end of the arm 8 to pass beyond the path of rotation of the teeth of the wheel 7 the hopper will be rendered inoperative, as is obvious. The movements of the lever 9 as just explained are conveniently effected by means of an operating lever 13 which is pivoted to the hopper 2 and is provided with a pin 14 engaging in a slot 15 in the rear end of the lever 9. The lever 9 is raised and lowered by raising and lowering the lever 13 and is held against vibration consequent to the action of the hopper by a spring 16 having one end connected to the lever 9 and the other end connected to the hopper.

In order to render the hopper inoperative as above explained the lever 13 is moved until its pin 14 abuts the inner end of the slot 15. The lever 13 then occupies a substantially upright position, beyond the perpendicular, as shown by dotted lines and will stand in such position and may be under the tension of the spring 16, it being understood that the pivot of the lever 13 and the pin 14 are so related that the lever 13 cannot be moved rearwardly on its pivot by the spring 16.

In order to hold the lever 13 in any position to which it may be adjusted a gage 17 is employed. This gage preferably comprises a member having a slot 18 for the passage of a headed bolt 20 to lie in the path of lever 9 and provided with a wing nut 21. When the desired position of the lever 9 has been determined the bolt 20 is adjusted to support the lever in such determined position, as is obvious. Should it be desired to interrupt the action of the hopper, the lever 13 is swung to its vertical position as above explained and when the operation of the hopper is to be established the lever 13 is moved downwardly until the lever 9 engages upon the headed bolt 20 of the gage. It will be obvious that the interruption and subsequent reëstablishment of the operation of the hopper entails no interference with the adjustment of the position of the lever 9.

When the tooth of the wheel 7 engages the arm 8 the hopper will be tilted rearwardly and downwardly and when the arm 8 is disengaged by the wheel 7 the hopper is quickly returned to normal position by a spring 22 connected to the front wall of the hopper and also connected to the beam. The return movement of the hopper is suddenly arrested by the engagement of projections 23 which stand out beyond the sides of the hopper with the uprights 4 and the shock or jar which is developed consequent to the engagement of the projections 23 with the uprights 4 is effective to cause the discharge of the material in the hopper through the outlet 6.

The connections herein described for effecting the operation of the hopper are not liable to derangement, are readily accessible for the purposes of substitution or repairs, and are associated with the hopper so as to coöperate for the efficient distribution of the fertilizer.

Having fully described my invention, I claim:

1. In a fertilizer distributer the combination with a bodily tiltable hopper, a ground wheel, and a spur wheel rotating with the ground wheel, of a vertical arm slidably associated with the hopper and arranged whereby its lower end may be engaged by the spur wheel, a horizontal lever pivoted at one end to the hopper and pivoted between its ends to the arm, a manually operable lever connected to said horizontal lever and operable to raise and lower the latter, a spring acting on the horizontal lever to hold it against vibration, and adjustable for limiting the downward movement of the horizontal lever.

2. In a fertilizer distributer the combination with a bodily tiltable hopper, a ground wheel, and a spur wheel rotating with the ground wheel, of a vertical arm slidably associated with the hopper and arranged whereby its lower end may be engaged by the spur wheel, a horizontal lever pivoted at one end to the hopper and pivoted between its ends to the arm, the horizontal lever having a longitudinal slot in its other end, a manually operable lever pivoted to the hopper and having a pin engaging in said slot, and a spring acting with downward pressure on the horizontal lever to hold the latter against vibration.

3. In a fertilizer distributer, the combination with a bodily tiltable hopper, a ground wheel, and a spur wheel rotating with the ground wheel, of a vertical arm slidably associated with the hopper and arranged whereby its lower end may be engaged by the spur wheel, a horizontal lever pivoted at one end to the hopper and pivoted between its ends to the arm, the horizontal lever having a longitudinal slot in its other end, a manually operable lever pivoted to the hopper and having a pin engaging in said slot, a spring acting with downward pressure on the horizontal lever to hold the latter against vibration, and a gage including an adjustable stop and operative to support the horizontal lever in a selected position.

In testimony whereof I affix my signature in presence of two witnesses.

SIMEON R. SIKES.

Witnesses:
C. A. J. HARPER,
L. R. TUCKER.

Copies of this patent may be obtained for five cents each, by addressing the "Commissioner of Patents, Washington, D. C."